US007408751B1

(12) United States Patent
Lien et al.

(10) Patent No.: US 7,408,751 B1
(45) Date of Patent: Aug. 5, 2008

(54) SELF-BIASED ELECTROSTATIC DISCHARGE PROTECTION METHOD AND CIRCUIT

(75) Inventors: Chuen-Der Lien, Los Altos Hills, CA (US); Shih-Ked Lee, Fremont, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 14 days.

(21) Appl. No.: 11/229,195

(22) Filed: Sep. 15, 2005

(51) Int. Cl.
*H02H 9/00* (2006.01)
(52) U.S. Cl. .................................. 361/56
(58) Field of Classification Search ................ 361/56
See application file for complete search history.

(56) References Cited

U.S. PATENT DOCUMENTS

| | | | | |
|---|---|---|---|---|
| 4,750,078 | A | * | 6/1988 | Ganger et al. .................. 361/56 |
| 5,576,635 | A | * | 11/1996 | Partovi et al. .................. 326/27 |
| 5,663,678 | A | | 9/1997 | Chang |
| 5,675,469 | A | | 10/1997 | Racino et al. |
| 5,914,844 | A | * | 6/1999 | Lutley et al. ................. 361/111 |
| 6,046,897 | A | * | 4/2000 | Smith et al. .................. 361/111 |
| 6,072,219 | A | * | 6/2000 | Ker et al. ..................... 257/355 |
| 6,184,700 | B1 | * | 2/2001 | Morris ........................ 326/14 |
| 6,265,931 | B1 | * | 7/2001 | Lutley et al. ................. 327/530 |
| 6,556,398 | B1 | | 4/2003 | Chen |
| 6,646,840 | B1 | * | 11/2003 | Sugerman et al. ............. 361/56 |
| 6,665,160 | B2 | | 12/2003 | Lin et al. |
| 6,747,501 | B2 | * | 6/2004 | Ker et al. ..................... 327/310 |
| 6,876,529 | B2 | | 4/2005 | Li |
| 6,898,060 | B2 | | 5/2005 | Juliano et al. |

OTHER PUBLICATIONS

Texas Instruments. High Performance Linear Products Technical Staff.LVDC Application and Data Handbook. Nov. 2002.*

* cited by examiner

*Primary Examiner*—Stephen W Jackson
*Assistant Examiner*—Scott Bauer
(74) *Attorney, Agent, or Firm*—Michael Hardaway; Glass & Associates

(57) ABSTRACT

A self-biased electrostatic discharge (ESD) protection circuit for protecting an integrated circuit operating in a normal voltage range that includes both positive and negative voltage levels is disclosed. The self-biased ESD protection circuit includes an input connection for receiving an input voltage, a protection transistor electrically coupled to the input connection, and an electrical sink. The protection transistor is operable to provide ESD protection from the input connection to the electrical sink. The self-biased ESD protection circuit also includes a metal oxide semiconductor (MOS) biasing network electrically coupled to the input connection and the protection transistor. The MOS biasing network is operable to cause the protection transistor to remain in a non-conductive state when the input voltage is in the normal operating voltage range. Upon the occurrence of an electrostatic discharge event at the input connection, the protection circuit becomes conducting to discharge ESD current from the input connection to the electrical sink.

32 Claims, 5 Drawing Sheets

# SELF-BIASED ELECTROSTATIC DISCHARGE PROTECTION METHOD AND CIRCUIT

BACKGROUND OF THE INVENTION

Electrostatic discharge (ESD) related failures have long plagued integrated circuit manufacturers and users. Electrostatic discharge induced failure becomes a major Integrated Circuit (IC) reliability problem as IC technologies migrate into the very-deep-sub-micron (VDSM), ultra large scale integration (ULSI) regime.

In the design and development of electrostatic discharge protection structures, the interactions between those structures and the circuits being protected are a vital consideration. Multipoint Low Voltage Differential Signaling (MLVDS) circuits, especially, pose unique difficulties to electrostatic discharge protection designers because of the polarity shifts associated with MLVDS operation.

Conventional electrostatic discharge protection circuits provide a shunt for electrostatic discharge energy at voltages above a threshold, typically the reverse bias breakdown voltage of a diode or the inherent diode action of a protection structure. In one type of common electrostatic discharge protection circuit, an Input/Output (I/O) connection is protected by providing a diode between the pad and ground, and a diode between the pad and $V_{CC}$. Normally, any voltage exceeding the threshold voltage ($V_T$) of either diode is shunted away from the internal circuit associated with the data pad. In devices operating exclusively in positive, or exclusively in negative, voltages relative to the substrate or to some other reference, the dual diode design works reasonably well. However, in MLVDS operation, the input voltage ($V_{IN}$) swing of normal operation ranges from positive to negative voltages. For example, the specification for MLVDS defines the signal voltage swing as −1.4V to +3.8V. Voltage swings of this magnitude can cause one or the other of the diodes to conduct, effectively shorting the pad during normal operation. Accordingly, dual-diode electrostatic discharge protection circuits are not suitable for MLVDS applications.

Another type of conventional ESD protection circuit uses a grounded-gate NMOS transistor that conducts electrostatic discharge energy to ground when the voltage of the electrostatic discharge exceeds the breakdown voltage of the device. When the electrostatic discharge (ESD) event has passed the gate voltage is pulled low and the MOS device is again non-conducting. This type of electrostatic discharge protection circuit works reasonably well where pad voltages during normal operation remain exclusively positive relative to ground. However, when operation involves negative as well as positive voltages, the MOS device can conduct during normal operation, thus effectively shorting the element to ground. Accordingly, grounded-gate MOS electrostatic discharge protection circuits are not suitable for MLVDS applications.

What is needed, then, is a means for protecting MLVDS circuits from electrostatic discharge that will not turn on during normal operation of the MLVDS circuit that includes both positive and negative voltage levels.

SUMMARY OF THE INVENTION

The present invention provides a method and apparatus for protecting an integrated circuit, which operates in a normal voltage range that includes both positive and negative voltage levels, from an electrostatic discharge (ESD) event. The method includes the steps of providing a protection transistor that can discharge an electrostatic discharge (ESD) current from an input connection to an electrical sink; biasing the protection transistor such that the protection transistor remains in a non-conductive state when voltages within the normal operating voltage range are received at the input connection; determining whether an electrostatic discharge (ESD) event has occurred at the input connection; and when an ESD event is detected at the input connection, and biasing the protection transistor so that it conducts ESD current to the electrical sink.

A self-biased electrostatic discharge protection circuit is disclosed that can provide ESD protection for an integrated circuit that has a normal operating voltage range including both positive and negative voltages. The self-biased electrostatic discharge protection circuit includes an input connection for receiving an input voltage, a protection transistor, and a metal oxide semiconductor (MOS) biasing network. In an ESD event, the protection transistor is biased to become conducting to provide an electrical path from the input connection to an electrical sink. In the normal operating condition, the protection transistor is biased to a non-conductive state. The biasing of the protection circuit is provided by the metal oxide semiconductor (MOS) biasing network. More particularly, the MOS biasing network is operable to keep the protection transistor in a non-conductive state when the input voltage is in the normal operating voltage range. Upon the occurrence of an electrostatic discharge event at the input connection, the protection circuit becomes conducting to discharge ESD current from input connection to the electrical sink.

These and other objects and advantages of the present invention will become obvious to those of ordinary skill in the art after having read the following detailed description of the preferred embodiments which are illustrated in the various drawing figures.

DETAILED DESCRIPTION

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description, numerous specific details are set forth in order to provide a thorough understanding of the present invention. However, it should be understood by one of ordinary skill in the art that the present invention may be practiced without these specific details. In other instances, well-known methods, procedures, components, and circuits have not been described in detail so as not to unnecessarily obscure aspects of the present invention. At times, concepts disclosed in this discussion of embodiments of the present invention will be made more readily apparent by reference to the Figures.

Figure 1:
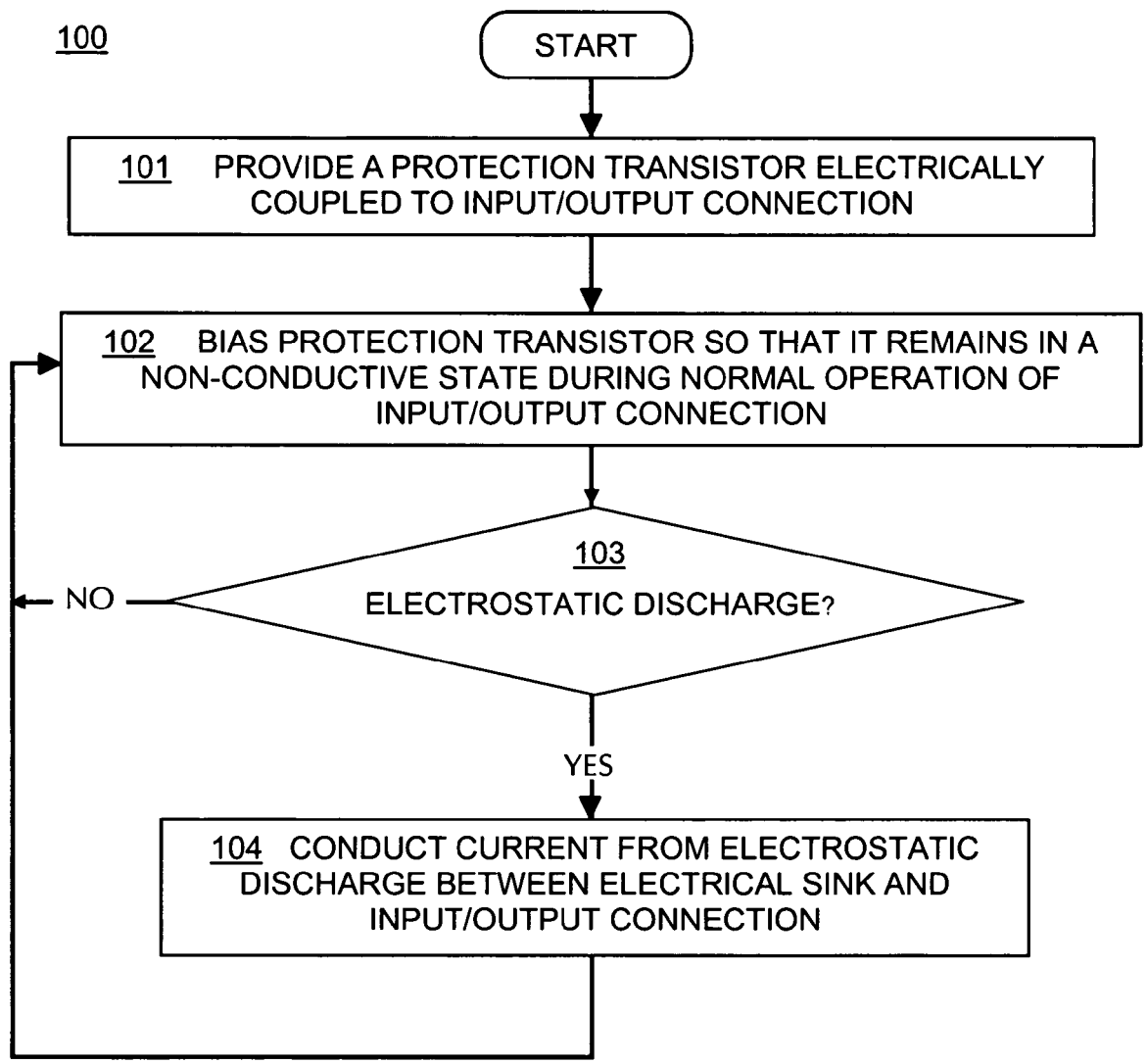
FIG. 1 illustrates a method of providing electrostatic discharge (ESD) protection for an integrated circuit that has a normal operating voltage range that includes both negative and positive voltage levels in accordance with an embodiment of the present invention.

Referring to FIG. 1, a method 100 of providing electrostatic discharge protection for an integrated circuit that has a normal operating voltage range that includes both negative and positive voltage levels is shown. It is noted here that embodiments of the present invention are described herein in reference to MLVDS specification TIA/EIA-899, which is incorporated herein by reference. Circuitry that is protected by embodiments of the present invention can include devices that communicate via MLVDS as well as devices that generate the positive and negative voltages associated with MLVDS operations.

It is also noted here that the term "electrical sink" is used herein to include electrical ground, a negative voltage source, as well as a positive voltage source. It is further noted here that the term "input/output connection" can be either an input connection or an output connection and can be a contact pad, a contact lead or other mechanism for coupling input or output to an integrated circuit device.

Method 100 includes the steps of providing a protection transistor that can discharge an electrostatic charge (ESD) current from an input/output (I/O) connection to an electrical sink 101; biasing the protection transistor such that the protection transistor remains in a non-conductive state when voltages within the normal operating voltage range are received at the input connection 102; determining whether an ESD event has occurred at the input connection 103; and, when an ESD event is detected at the input connection, and biasing the protection transistor so that it conducts current to the electrical sink 104.

It is noted here that electrostatic discharge events can be positive or negative voltage events, with respect to voltages presented in a semiconductor device, of large magnitude. An electrostatic discharge can be positive or negative with respect to Vcc, positive or negative with respect to ground, or positive or negative with respect to any non-power pad. Magnitudes of electrostatic discharges can be as much as 2000 volts, or more. Embodiments of the present invention are directed to protecting circuits from electrostatic discharges exhibiting any of the above characteristics.

Referring to step 101, a protection transistor is provided that is electrically connected to an input/output connection of an integrated circuit. In the present embodiment the integrated circuit is a Multipoint Low Voltage Differential Signaling (MLVDS) Integrated Circuit (IC) that is connected to the integrated circuit. The protection transistor is capable of providing a discharging path from the input/output connection of the integrated circuit to an electrical sink when an ESD event occurs. During a normal operating condition, upon receiving voltages within the normal operating voltage range, the protection transistor is biased to be in a non-conductive state 102. The biasing of the protection circuit is performed by a Metal Oxide Semiconductor (MOS) network. In the non-conductive state, the protection circuit does not interfere with the normal operation of the integrated circuit even when the input voltage at the input/output connection is a negative voltage. When an ESD event occurs, the protection transistor is biased so that it is in a conductive state, discharging ESD current from the input connection to the electrical sink. In one embodiment of the present invention, the protection transistor is a bipolar junction transistor (BJT) that behaves as a p-n junction diode in the reversed bias region during the normal operating voltage range. In the event of an electrostatic discharge, the bipolar junction transistor is biased to be placed in a breakdown region where it becomes conducting to discharge ESD current from the input connection to the electrical sink. In the present embodiment of the invention, the MOS biasing network comprises NMOS transistors. In another embodiment, the biasing network comprises PMOS transistors.

Now referring to step 102, the protection transistor is biased such that the protection transistor is in a non-conductive state when voltage level at the input connection is in the normal operating voltage range of the integrated circuit. The normal operating voltage range can include both positive and negative voltage levels. In one embodiment of the present invention, the normal operating voltage range is that of a Multipoint Low Voltage Differential Signaling integrated circuit (MLVDS), which is between −1.4 volts and 3.8 volts. In one embodiment of the present invention, when the MOS biasing network receives an input voltage that is in the normal operating range, the MOS biasing network places the protection transistor in the reversed bias region so that the protection transistor does not conduct, thus not interfering with the operation of the integrated circuit.

Now referring to steps 102 and 103, the protection transistor remains biased in a non-conductive state until the occurrence of an ESD event. The protection circuit is biased such that it is in a non-conductive state and not interfering with the operation of the integrated circuit even when the normal operating voltage includes a negative voltage. In one embodiment of the present invention, the non-conductive state of the protection circuit is the reversed bias state of a p-n junction diode. In one embodiment of the present invention, step 103 is performed by a Metal Oxide Semiconductor (MOS) biasing network that is electrically connected to the protection transistor so that the MOS biasing network provides biasing for the protection transistor. The biasing of the protection transistor depends on the voltage levels received at the input connection.

Next, referring to step 104, upon the detection of an ESD event, ESD current from the input connection is discharged to the electrical sink. Step 104 is performed by the protection circuit. When an electrostatic discharge event is detected, the protection circuit is biased so that it is placed in a conductive state. A conducting protection transistor discharges electrostatic discharge current from the input connection to the electrical sink, thus protecting the integrated circuit. In one embodiment of the present invention, the conductive state is the breakdown reverse bias of a p-n junction diode.

Figure 2:
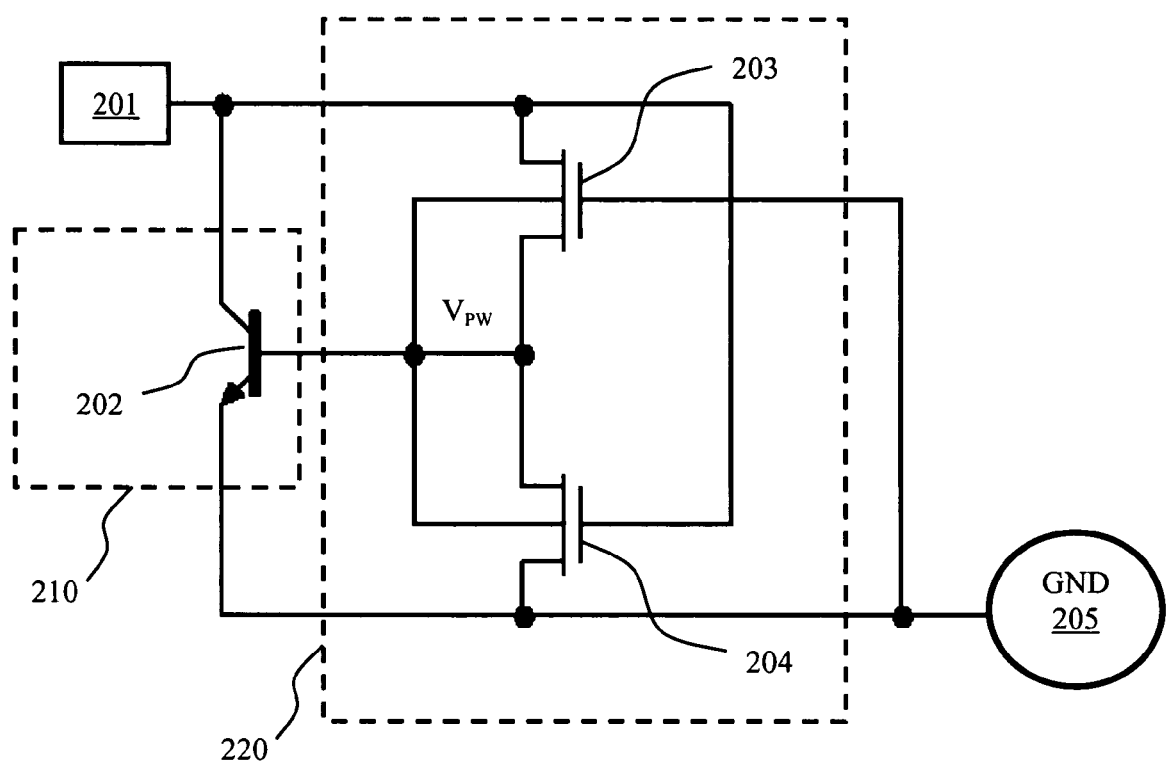
FIG. 2 illustrates a schematic diagram of a self-biased electrostatic discharge protection circuit that is operable to protect an integrated circuit from an ESD event by conducting ESD current to an electrical ground in accordance with an embodiment of the present invention.

In the embodiment of the present invention illustrated in FIG. 2, method 100 is performed by self-biased ESD protection circuit 200. More particularly, a self-biased electrostatic discharge protection circuit 200 provides ESD protection to an integrated circuit by conducting ESD current from an input connection 201 to an electrical ground 205. Self-biased electrostatic discharge protection circuit 200 includes a protection transistor 210, and a Metal Oxide Semiconductor (MOS) biasing network 220. The MOS biasing network 220 is electrically connected to the protection transistor 210 and provides biasing thereto. In a normal operating condition, e.g., when the voltage level received at input connection 201 is within the normal operating voltage range of the integrated circuit, MOS biasing circuit 220 biases protection circuit 210 so that protection circuit 210 is in a non-conductive state. As a result, protection circuit 210 is not interfering with the normal operation of the integrated circuit. On the other hand, when an electrostatic discharge event occurs, e.g., when voltage levels at input connection 201 surpass a certain voltage level (e.g. breakdown threshold voltage), protection circuit 210 is placed in the conductive state. Protection circuit 210, in the conductive state, discharges ESD current from input connection 210 to electrical ground 205, thus protecting the integrated circuit connected thereto.

In the present embodiment, protection transistor 210 is an NPN bipolar junction transistor 202. It is understood that protection transistor 210 can include a plurality of NPN bipolar junction transistors and any other combinations thereof to achieve the same described function. The present invention is intended to include all such alternatives. The collector terminal of NPN bipolar junction transistor 202 is electrically connected to input connection 201. The emitter terminal of NPN bipolar junction transistor 202 is electrically connected to electrical ground 205. As such, NPN bipolar junction transistor 202 provides an electrical discharging path from collector terminal to emitter terminal to discharge ESD current from input connection 201 to electrical ground 205. The base terminal of NPN bipolar junction transistor 202 forms a node Vpw. The biasing of NPN bipolar junction transistor 202 depends on the voltage at node $V_{PW}$, and the voltage at input connection 201. The voltage at node $V_{PW}$ is provided by MOS biasing network 220 which includes first NMOS transistor 203 and second NMOS transistor 204. It is understood that alternatively MOS biasing network 220 can include other combinations of NMOS and/or PMOS transistors, bipolar junction transistors, etc. to achieve the same described function. The present invention is intended to include all such alternatives. The drain of first NMOS transistor 203 is electrically connected to input connection 201, the collector terminal of NPN bipolar junction transistor 202, and to the gate of second NMOS transistor 204. The gate of first NMOS transistor 203 is electrically connected electrical ground 205. The source of first NMOS transistor 203 is electrically connected to the drain of second NMOS transistor 204 and to the base terminal of NPN transistor 202 at node $V_{PW}$. The source of second NMOS transistor 204 is electrically connected to electrical ground 205 and to the emitter terminal of NPN bipolar junction transistor 202. The bodies of first NMOS transistor 203 and second NMOS transistor 204 are electrically connected together and to node $V_{PW}$.

It is noted here that the reverse bias voltage that can overcome the inherent diode effect of a typical NPN or PNP bipolar transistor is smaller than the magnitude of a typical electrostatic discharge but larger than the magnitude of the operating range voltages of MLVDS. In this embodiment of the present invention, when an electrostatic discharge occurs, the reverse bias voltage capability of protection transistor 202 is exceeded and current flows between input connection 201 and ground 205. Because the current flow can charge the intervening region of the bipolar transistor (N-region of a PNP, P-region of an NPN) the effective reverse bias voltage is decreased and current can continue to flow despite a drop in the voltage at input 201 to a normal operating voltage. Biasing network 220 restores the normal operating condition of protection transistor 202 by quickly restoring the normal bias and stopping further current flow.

In operation, when the voltage at input connection 201 is negative, the gate/source voltage of second NMOS transistor 204 is smaller than the drain/source voltage ($V_{GS}<V_{DS}$) making second NMOS transistor 204 non-conductive, or OFF, and isolating node $V_{PW}$ from electrical ground 205. First NMOS transistor 203 is ON because the gate source voltage $V_{GS}$ at first NMOS transistor 203 is greater than the drain source voltage ($V_{GS}>V_{DS}$). Thus, first NMOS transistor 203 is ON, pulling node $V_{PW}$ to the voltage at input connection 201. As a result, within NPN bipolar junction transistor 202, the base voltage equals to the collector voltage NPN ($V_{PW}=V_{IN}$). Thus, under this condition, NPN bipolar junction transistor 202 behaves as a p-n junction diode with anode electrically connected to input connection 201 and cathode electrically connected to electrical ground 205. Under normal operating condition, NPN bipolar junction transistor 202 is biased as a diode in the reversed bias region. Even when input voltage ($V_{IN}$) at input connection 201 is at a negative voltage level ($V_{IN}=-1.4$ volts), NPN bipolar junction transistor 201 is in reversed bias and thus in non-conductive state. Thus, NPN bipolar 202 is in non-conductive state and not interfering with the normal operation of the integrated circuit.

When an electrostatic discharge event occurs, the high input voltage at input connection 201 causes NPN bipolar junction transistor 202 (connected as p-n junction diode) to enter the reversed breakdown region. More particularly, ESD causes NPN bipolar junction transistor 202 to become conductive in the reversed breakdown region. As a result, NPN bipolar junction transistor 202 discharges the large ESD current from input connection 201 to electrical ground 205, thus protecting the integrated circuit from being permanently damaged by an ESD event. After the electrostatic discharge event, in this embodiment of the present invention, the protection transistor is restored to a non-conducting state. It is noted here that the avalanche effect generally occurs in a p-n junction at −5V and the Zener effect generally occurs at −7V. Therefore, when the input voltage $V_{IN}$ at input/output connection exceeds −5V, NPN transistor 202 enters the reversed bias region and becomes conductive. It is further noted that a typical electrostatic discharge can be of 2000 volts or more. At such high voltages, the breakdown voltage of the NPN bipolar protection transistor 202 is exceeded by a significant margin.

Referring again to FIG. 2, when the voltage at input connection 201 is positive, first NMOS transistor 203 turns OFF because the drain-source voltage is now greater than the gate-source voltage ($V_{GS}<V_{DS}$). As a result, first NMOS transistor 203 shields node $V_{PW}$ from input voltage ($V_{IN}$). Second NMOS transistor 204 is now ON because its gate source voltage ($V_{GS}$) is greater than its drain source voltage ($V_{DS}$). When second NMOS transistor 204 is ON it pulls node $V_{PW}$ toward electrical ground 205, ($V_{PW}=0$). As a result, NPN bipolar junction transistor 202 behaves as a p-n junction diode with its cathode electrically connected to input connection 201 and its anode electrically connected to electrical ground 205. Accordingly, under the normal operating condition when input voltage at input connection 201 is positive, NPN bipolar junction transistor 202 is biased as a p-n junction diode (base voltage $V_{PW}$ equals emitter voltage and electrical ground 205) in reversed bias region, and thus is in a non-conductive state. More particularly, the polarity of the p-n junction diode in this case ($V_{IN}>V_B$) is the reverse of that in the previous case when the input voltage is negative. Accordingly, when either a positive voltage or a negative voltage is received that is within the normal operating voltage range of the integrated circuit, MOS biasing circuit 220 ensures that NPN bipolar junction transistor 202 is placed in the non-conductive state of the reversed bias region. The polarity of the resulting p-n junction diode depends on the polarity of the input voltage ($V_{IN}$) at input connection 201.

It is noted here, again, that the normal operating voltage range of MLVDS is −1.4V to +3.8V, as specified in TIA/EIA-899. In the present embodiment, the term "normal operating voltage" is used to denote that voltage range. In other embodiments, however, a normal operating range can be larger or smaller, including both positive and negative operating voltages.

When an electrostatic discharge event occurs, NPN bipolar junction transistor 202 is placed in the reversed bias breakdown region. Under the break-down reversed bias region, NPN bipolar junction transistor 202 becomes momentarily conductive. As a result, ESD current is discharged from input connection 201 to electrical ground 205 through the reversed breakdown NPN bipolar junction transistor 202.

Figure 3:
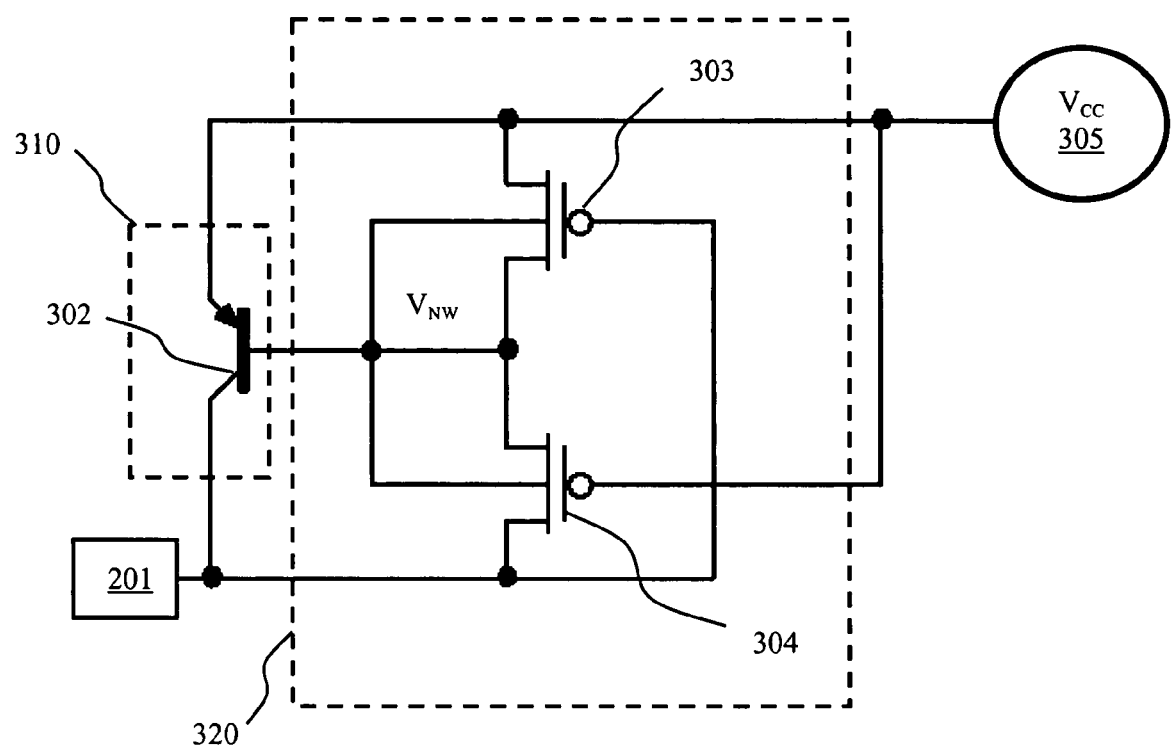
FIG. 3 illustrates a schematic diagram of a self-biased electrostatic discharge protection circuit that is operable to protect the integrated circuit from an ESD event by conducting ESD current to a voltage supply in accordance with an embodiment of the present invention.

In the embodiment of the present invention illustrated in FIG. 3, method 100 is performed by a self-biased electrostatic discharge protection circuit 300. More particularly, self-biased ESD circuit 300 provides ESD protection to an integrated circuit by discharging ESD current to a voltage supply. Self-biased electrostatic discharge protection circuit 300 includes a protection transistor 310, and a Metal Oxide Semiconductor (MOS) biasing network 320. MOS biasing network 320 is electrically connected to the protection transistor 310 and provides biasing to the protection transistor 310. In a normal operating condition, e.g., when the voltage level received at the input connection is within the normal operating voltage range of the integrated circuit, the MOS biasing circuit 320 biases protection 310 circuit so that protection circuit 310 is in a non-conductive state. As a result, protection circuit 310 does not interfere with the normal operation of the integrated circuit. A non-conducting protection transistor 310 does not draw current in or out of the integrated circuit. On the other hand, when an electrostatic discharge event occurs, e.g., when voltage levels at the input connection surpasses a certain voltage level such as breakdown voltage, VBD, protection transistor 310 is placed in a breakdown conductive state. In the breakdown region, protection transistor 310 becomes conducting and discharges ESD current from input connection 201 to the electrical sink, $V_{CC}$ 305 in this embodiment, thus protecting the integrated circuit.

Referring again to FIG. 3, in the present embodiment, protection transistor 310 is implemented as a single PNP bipolar junction transistor 302. However, it is understood that protection transistor 310 can be implemented alternatively in other combinations of NMOS and/or PMOS transistors, bipolar junction transistors, etc. to achieve the same described function. The present invention is intended to include all such alternatives.

Though MOS biasing network 320 of FIG. 3 is shown to include two PMOS transistors 303 and 304, it is appreciated that, alternatively, MOS biasing network 320 can also be implemented in other combinations of NMOS and/or PMOS transistors, bipolar junction transistors, etc. to achieve the same described function. The present invention is intended to include all such alternatives.

The collector terminal of PNP bipolar junction transistor 302 is electrically connected to input connection 201. The emitter terminal of PNP bipolar junction transistor 302 is electrically connected to supply voltage 305. As such, PNP bipolar junction transistor 302 provides an electrical discharging path from collector terminal to emitter terminal to discharge ESD current from input connection 201 to supply voltage 305. The base terminal of PNP bipolar junction transistor 302 forms a node $V_{NW}$. The biasing of PNP bipolar junction transistor 302 depends on the voltage at node $V_{NW}$ and the voltage at input connection 201.

The voltage at node $V_{NW}$ is provided by MOS biasing network 320 which includes first PMOS transistor 303 and second PMOS transistor 304. The drain of second PMOS transistor 304 is electrically connected to input connection 201, the collector terminal of PNP bipolar junction transistor 302, and the gate of first PMOS transistor 303. The gate of second PMOS transistor is electrically connected to supply voltage 305 and the emitter terminal of PNP bipolar junction transistor 302. The source of second PMOS transistor 304 is electrically connected to the drain of first PMOS transistor 303, and to the base terminal of PNP transistor 302 at node $V_{NW}$. The source of first NMOS transistor 303 is electrically connected to voltage supply 305 and to the emitter terminal of PNP bipolar junction transistor 302. The bodies of first PMOS transistor 303 and second PMOS transistor 304 are electrically connected together and to node $V_{NW}$.

In operation, when the voltage at input connection 201 is less than the supply voltage 305 ($V_{IN}<V_{CC}$) first PMOS transistor 303 is ON, pulling up node $V_{NW}$ to voltage supply ($V_{CC}$) 305. Second PMOS transistor 304 is OFF because the gate-source voltage $V_{GS}$ is less than the drain-source voltage ($V_{DS}$). Thus, second PMOS transistor 304 is OFF, isolating node $V_{NW}$ from input voltage ($V_{IN}$). As a result, the base voltage of PNP bipolar junction transistor 302 is equal to the emitter voltage of PNP bipolar junction transistor 302, ($V_{NW}=V_{CC}$). Thus, under this condition ($V_{IN}<V_{CC}$), PNP bipolar transistor 302 behaves as a p-n junction diode with its anode electrically connected to input connection 301 and its cathode electrically connected to voltage supply 305. Under the current condition ($V_{IN}<V_{CC}$), PNP bipolar junction transistor 302 is biased as a p-n junction diode (because $V_{NW}=V_{CC}$) in the reversed bias region because the cathode voltage ($V_{CC}$) is greater than that at anode ($V_{IN}$). Even when input voltage ($V_{IN}$) is at a negative voltage level (e.g., $V_{IN}=-1.4$ volts$<V_{CC}$), PNP bipolar junction transistor 302 is in reversed bias and thus non-conductive. Accordingly, PNP bipolar junction transistor 302 is in non-conductive state (by being biased as a p-n junction diode in the reversed bias region) when $V_{IN}<V_{CC}$.

When an electrostatic discharge event occurs, the high input voltage ($V_{IN}$) at input connection 201 causes PNP bipolar junction transistor 302 to enter the reversed bias breakdown region. The reversed bias breakdown causes PNP bipolar junction transistor 302 to discharge large ESD current from input connection 201 to supply voltage 305. In this manner, the integrated circuit that is connected to self-biased electrostatic discharge (ESD) protection circuit 300 at input connection 201 is protected from being permanently damaged by an electrostatic discharge (ESD) event.

Referring again to FIG. 3, when the voltage at the input connection 201 is greater than voltage supply ($V_{CC}$) 305 ($V_{IN}>V_{CC}$), first PMOS transistor 303 turns OFF because the gate-source voltage is now greater than the drain-source voltage ($V_{GS}>V_{DS}$). As a result, first PMOS transistor 303 shields node $V_{NW}$ from voltage supply ($V_{CC}$) 305. Second PMOS transistor 304 is now ON because its gate-source voltage ($V_{GS}$) is less than its drain-source voltage ($V_{DS}$). When second PMOS transistor 304 is ON, it pulls node $V_{NW}$ to input voltage, ($V_{NW}=V_{IN}$). As a result, PNP bipolar junction transistor 302 behaves as a p-n junction diode with its anode electrically connected to supply voltage 305 and cathode electrically connected to input connection 301. Under the normal operating condition where the input voltage at input connection 201 is greater than voltage supply ($V_{CC}$) 305 ($V_{IN}$>$V_{CC}$), PNP bipolar junction transistor 302 is biased to behave as a p-n junction diode (base voltage $V_{NW}$ is equal to collector voltage) in the reversed bias region. Therefore, PNP bipolar transistor 302 is in a non-conductive state.

However, when an electrostatic discharge event occurs ($V_{IN}$>>$V_{CC}$), PNP bipolar junction transistor 302 is placed in the reversed bias break-down region. Under the reversed bias break-down region, PNP bipolar junction transistor 302 becomes momentarily conductive. As a result, ESD current is discharged from input/output connection 201 to supply voltage ($V_{CC}$) 305 through the reversed breakdown PNP bipolar junction transistor 302.

Figure 4:
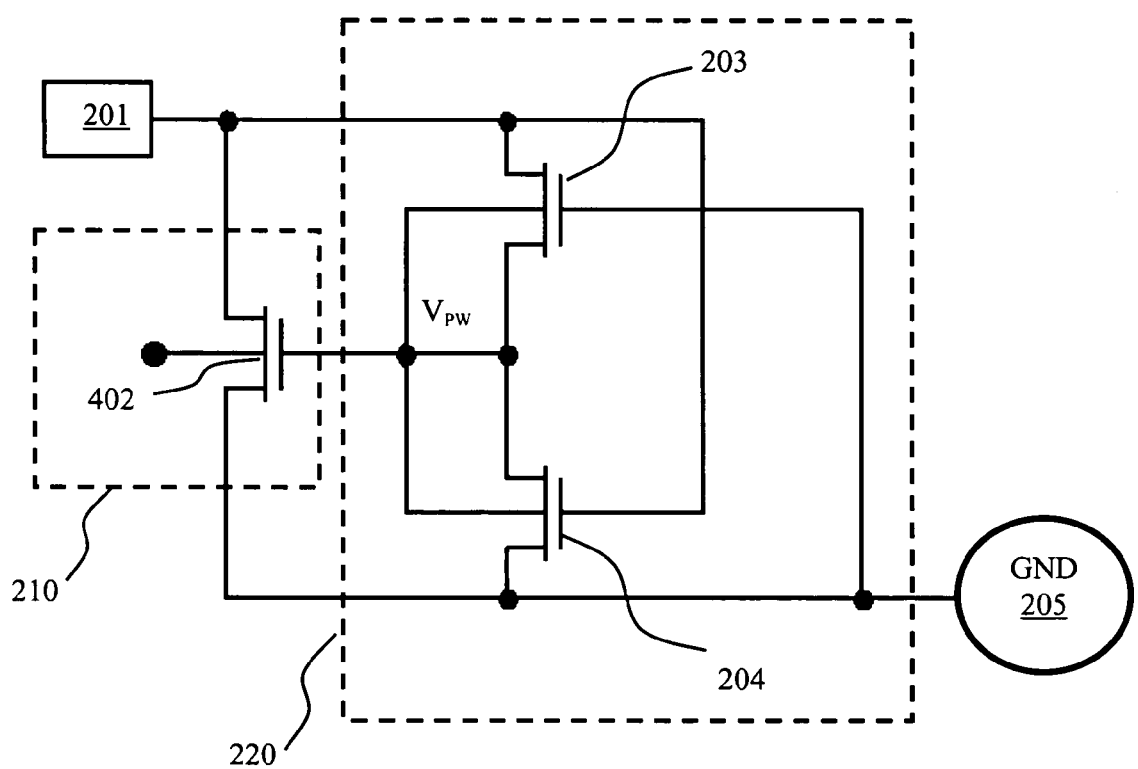
FIG. 4 illustrates one embodiment of the self-biased electrostatic discharge protection circuit of FIG. 1 that uses an N-type Field Effect Metal Oxide Semiconductor (NMOS) as a protection circuit in accordance with an embodiment of the present invention.

Now referring to FIG. 4, an embodiment is illustrated in which protection transistor 210 is implemented as an NMOS transistor. More particularly, self-biased ESD protection circuit 400 is shown that includes a third NMOS transistor 402 that forms the protection circuit 210. The drain of third NMOS transistor 402 is electrically connected to input connection 201. The source of third NMOS transistor 402 is electrically connected to an electrical ground 205. As such, third NMOS transistor 402 provides an electrical discharging path from drain to source to discharge electrostatic discharge current from input connection 201 to electrical ground 205. The gate of third NMOS transistor 402 forms a node $V_{PW}$. The biasing of third NMOS transistor 402 depends on the voltage at node $V_{PW}$, and the voltage at input connection 201.

The voltage at node $V_{PW}$ is provided by MOS biasing network 220. The drain of first NMOS transistor 203 is electrically connected to input connection 201, the drain of third NMOS transistor 402, and to the gate of second NMOS transistor 204. The gate of first NMOS transistor 203 is electrically connected to electrical ground 205. The source of first NMOS transistor 203 is electrically connected to the drain of second NMOS transistor 204, the gate of third NMOS transistor at node $V_{PW}$. The source of second NMOS transistor 204 is electrically connected to electrical ground 205 and to the source of third NMOS transistor 402. The bodies of first NMOS transistor 203 and second NMOS transistor 204 are electrically connected together and to node $V_{PW}$.

The operating principle of self-biased protection circuit 400 is similar to that of circuit 200. When voltages in the normal operating voltage range are received at input connection 201, third NMOS transistor 402 is biased as a p-n junction diode in the reversed bias region so that NMOS transistor 402 is in a non-conductive state. Thus, even when input voltage at input connection 201 is negative (e.g., −1.4 volts), third NMOS transistor 402 is biased as a reversed bias diode and so does not interfere with the operation of the protected integrated circuit. However, when an electrostatic discharge (ESD) event occurs, third NMOS transistor 402 is placed temporarily in the breakdown region. The breakdown causes third NMOS transistor 402 to conduct, dumping the characteristically large electrostatic discharge (ESD) current to electrical ground 205. Hence, the integrated circuit is protected from being permanently damaged by an electrostatic discharge (ESD) event.

Figure 5:
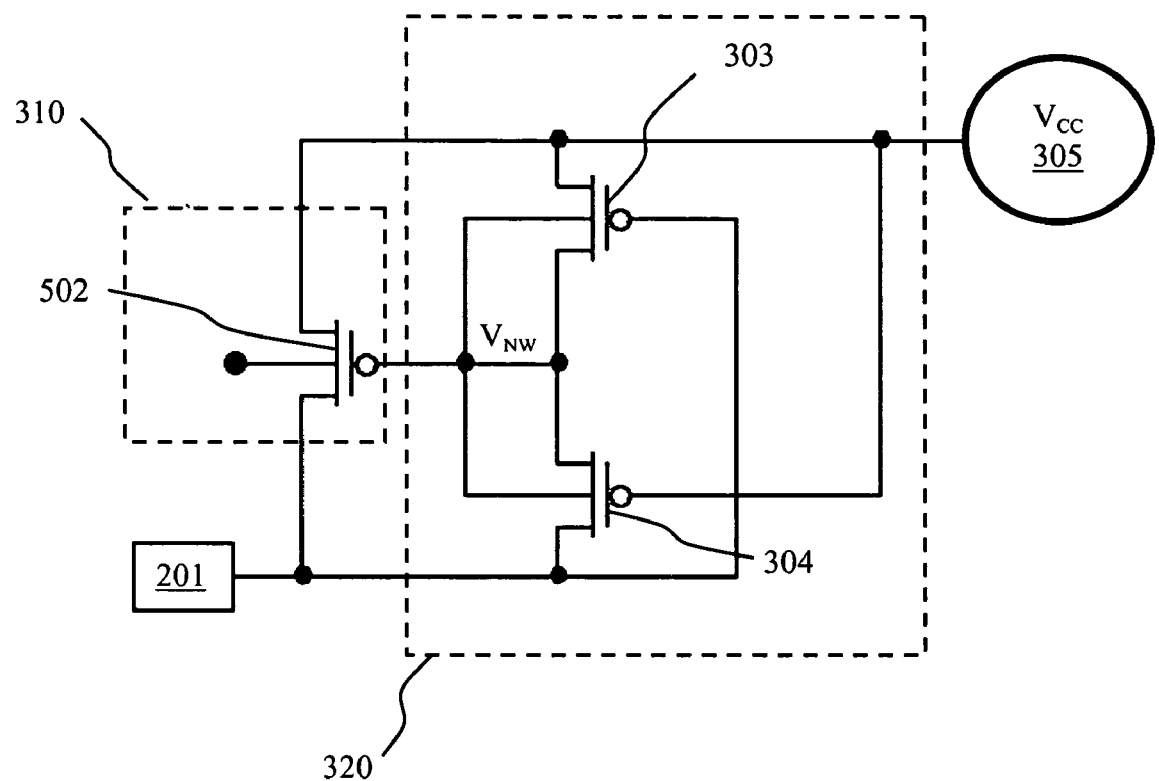
FIG. 5 illustrates one embodiment of the self-biased electrostatic discharge protection circuit of FIG. 2 that uses an P-type Field Effect Metal Oxide Semiconductor (PMOS) as a protection circuit in accordance with an embodiment of the present invention.

Now referring to FIG. 5, an embodiment is shown in which protection circuit 310 is implemented by an PMOS transistor 502. The drain of PMOS transistor 502 is electrically connected to input connection 201 and the source of PMOS transistor 502 is electrically connected to supply voltage 305. PMOS transistor 502 provides an electrical discharging path to discharge ESD current from input/output connection 201 to supply voltage ($V_{CC}$) 305. The gate of PMOS transistor 502 forms node $V_{NW}$. The biasing of PMOS transistor 502 depends on the voltage at node $V_{NW}$, and the voltage at input connection 201. The voltage at node $V_{NW}$ is provided by MOS biasing network 320. The drain of second PMOS transistor 304 is electrically connected to input connection 201, the drain PMOS transistor 502, and to the gate of first PMOS transistor 303. The gate of second PMOS transistor 304 is electrically connected to supply voltage 305. The source of second PMOS transistor 304 is electrically connected to the drain of first PMOS transistor 303, and the gate of PMOS transistor 502 at node $V_{NW}$. The source of first PMOS transistor 303 is electrically connected to voltage supply 305 and to the source of PMOS transistor 502. The bodies of first PMOS transistor 303 and second PMOS transistor 304 are electrically connected together and to node $V_{NW}$.

In operation within the normal operating voltage range, PMOS transistor 502 is biased as a p-n junction diode in the reversed bias region so that PMOS transistor 502 is not conducting. When an ESD event occurs, PMOS transistor 502 is placed temporarily in the breakdown region. The punch-through phenomenon in the breakdown region causes PMOS transistor 502 to conduct, again dumping the characteristically large ESD current to electrical sink 305. Hence, the integrated circuit is protected from being permanently damaged by an ESD event.

It is noted here, again, that the terms "normal voltage" and "normal operating voltage range", as used in this description of embodiments of the present invention, refer to the voltage range −1.4V to +3.8V, the range of normal MLVDS communications protocol as specified in TIA/EIA-899. While primarily used to denote MLVDS-specific voltages, the terms can, in other embodiments of the present invention, other operating voltage ranges which include both positive and negative values, with magnitudes less than the breakdown voltages of associated semiconductor devices.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

We claim:

1. A method for protecting an integrated circuit device from electrostatic discharge, the integrated circuit device operating in a normal voltage range that includes both positive and negative voltage levels, the method comprising:

providing a bipolar junction protection transistor electrically coupled to an input/output connection of the integrated circuit, the protection transistor having a collector coupled to the input/output connection, an emitter coupled to an electrical sink and a base, the protection transistor positioned to conduct an electrostatic charge between the input/output connection and the electrical sink;

biasing the protection transistor such that the protection transistor in a non-conductive state when a negative voltage within the normal operating voltage range of the integrated circuit is received at said input/output connection;

biasing the protection transistor such that the protection transistor in a non-conductive state when a positive voltage within the normal operating voltage range of the integrated circuit is received at said input/output connection; and biasing the protection transistor such that the protection transistor conducts current to the electrical sink upon an electrostatic discharge event at the input/output connection.

2. The method for protecting an integrated circuit device from electrostatic discharge described in claim 1, wherein the protection transistor is an NPN bipolar junction transistor, and wherein biasing the protection transistor such that the protection transistor is in a non-conductive state when a negative voltage within the normal operating voltage range is received at the input/output connection further comprises biasing the NPN transistor such that the base voltage is substantially equal to the collector voltage, and wherein biasing the protection transistor such that the protection transistor is in a non-conductive state when a positive voltage within the normal operating voltage range is received at the input/output connection further comprises biasing the NPN transistor such that the base voltage is substantially equal to the emitter voltage.

3. The method for protecting an integrated circuit device from electrostatic discharge described in claim 1, wherein the protection transistor is a PNP bipolar junction transistor, and wherein the step of biasing the protection transistor such that the protection transistor is in a non-conductive state when a negative voltage within the normal operating voltage range is received at the input/output connection further comprises biasing the PNP transistor such that the base voltage is substantially equal to the emitter voltage and wherein the step of biasing the protection transistor such that the protection transistor is in a non-conductive state when a positive voltage within the normal operating voltage range is received at the input/output connection further comprises biasing the PNP transistor such that the base voltage is substantially equal to the collector voltage.

4. The method for protecting an integrated circuit device from electrostatic discharge described in claim 1, wherein the electrical sink is a voltage source.

5. The method for protecting an integrated circuit device from electrostatic discharge described in claim 1, further comprising determining whether an electrostatic discharge (ESD) event has occurred at the input/output connection by comparing the voltage at the input/output connection to a predetermined voltage and placing the protection transistor in a conducting state when the voltage at the input/output connection is greater than that of the predetermined voltage, and placing the protection transistor in a non-conductive state when the voltage at the input/output connection is less than or equal to that of the predetermined voltage.

6. The method for protecting an integrated circuit device from electrostatic discharge described in claim 1, wherein the biasing is accomplished by a first biasing element comprising a first biasing MOSFET and a second biasing element comprising a second biasing MOSFET, the source of the first biasing MOSFET and the drain of the second biasing MOSFET electronically coupled to each other and to the base connection of the protection transistor.

7. The method for protecting an integrated circuit device from electrostatic discharge described in claim 1, wherein the integrated circuit device comprises a multipoint low voltage differential signaling device.

8. The method of protecting an integrated circuit device of claim 1 wherein biasing the protection transistor such that the protection transistor conducts current to the electrical sink upon an electrostatic discharge event at the input/output connection further comprises biasing the protection transistor in a reversed breakdown region when the electrostatic discharge event occurs.

9. The method for protecting an integrated circuit device from electrostatic discharge described in claim 1, wherein the electrical sink is an electrical ground.

10. A method for protecting an integrated circuit device from electrostatic discharge, the integrated circuit device operating in a normal voltage range that includes both positive and negative voltage levels the method comprising:
providing a MOS protection transistor having a drain coupled to an input/output connection, a source coupled to an electrical sink and a gate;
biasing the protection transistor such that the protection transistor is in a non-conductive state when a negative voltage within the normal operating voltage range is received at the input/output connection;
biasing the protection transistor such that the protection transistor is in a non-conductive state when a positive voltage within the normal operating voltage range is received at the input/output connection; and
biasing the protection transistor such that the protection transistor conducts current to the electrical sink upon an electrostatic discharge event at the input/output connection.

11. The method for protecting an integrated circuit device from electrostatic discharge described in claim 10, wherein the MOS protection transistor is an NMOS transistor, and wherein the step of biasing the protection transistor such that the protection transistor is in a non-conductive state when a negative voltage within the normal operating voltage range is received at the input/output connection further comprises biasing the NMOS transistor such that the drain voltage is substantially equal to the gate voltage and wherein the step of biasing the protection transistor such that the protection transistor is in a non-conductive state when a positive voltage within the normal operating voltage range is received at the input/output connection further comprises biasing the NMOS transistor such that the source voltage is substantially equal to the gate voltage.

12. The method for protecting an integrated circuit device from electrostatic discharge described in claim 10, wherein the MOS protection transistor is an PMOS transistor, and wherein the step of biasing the protection transistor such that the protection transistor is in a non-conductive state when a negative voltage within the normal operating voltage range is received at the input/output connection further comprises biasing the PMOS transistor such that the source voltage is substantially equal to the gate voltage and wherein the step of biasing the protection transistor such that the protection transistor is in a non-conductive state when a positive voltage within the normal operating voltage range is received at the input/output connection further comprises biasing the PMOS transistor such that the drain voltage is substantially equal to the gate voltage.

13. The method for protecting an integrated circuit device from electrostatic discharge described in claim 10, wherein the electrical sink is a voltage source.

14. The method for protecting an integrated circuit device from electrostatic discharge described in claim 10, wherein the electrical sink is an electrical ground.

15. The method for protecting an integrated circuit device from electrostatic discharge described in claim 10, further comprising determining whether an electrostatic discharge (ESD) event has occurred at the input/output connection by comparing the voltage at the input/output connection to a predetermined voltage and placing the protection transistor in a conducting state when the voltage at the input/output connection is greater than that of the predetermined voltage, and placing the protection transistor in a non-conductive state when the voltage at the input/output connection is less than or equal to that of the predetermined voltage.

16. The method for protecting an integrated circuit device from electrostatic discharge described in claim 10, wherein the biasing is accomplished by a first biasing element comprising a first biasing MOSFET and a second biasing element comprising a second biasing MOSFET, the source of the first biasing MOSFET and the drain of the second biasing MOSFET electronically coupled to each other and to the base connection of the protection transistor.

17. The method for protecting an integrated circuit device from electrostatic discharge described in claim 10, wherein the integrated circuit device comprises a multipoint low voltage differential signaling device.

18. The method of protecting an integrated circuit device of claim 10, wherein biasing the protection transistor such that the protection transistor conducts current to the electrical sink upon an electrostatic discharge event at the input/output connection further comprises biasing the protection transistor in a reversed breakdown region when the electrostatic discharge event occurs.

19. A self-biased ESD protection circuit for protecting an integrated circuit operating in a normal voltage range that includes both positive and negative voltage levels, comprising:
    an input/output connection for receiving a voltage;
    a bipolar junction protection transistor electrically coupled to the input/output connection, the protection transistor having a collector coupled to the input/output connection, an emitter coupled to an electrical sink and a base, the protection transistor operable to provide electrostatic discharge (ESD) protection from the input/output connection to an electrical sink; and
    a metal oxide semiconductor (MOS) biasing network electrically coupled to the input/output connection and the protection transistor, the MOS biasing network operable to bias the protection transistor in a non-conductive state when a negative voltage within the normal operating voltage range of the integrated circuit is received at the input/output connection, to bias the protection transistor in a non-conductive state when a positive voltage within the normal operating voltage range of the integrated circuit is received at the input/output connection and to bias the protection transistor to conduct current to the electrical sink upon the occurrence of an electrostatic discharge event at the input/output connection.

20. The self-biased electrostatic discharge protection circuit described in claim 19, wherein the MOS biasing network comprises:
    a first biasing element having a source electronically coupled to the base of the protection transistor and a drain electronically coupled to the input/output connection; and
    a second biasing element having a drain electronically coupled to the base of the protection transistor and a source electronically coupled to the electrical sink.

21. The self-biased electrostatic discharge protection circuit described in claim 19, wherein the electrical sink is an electrical ground.

22. The self-biased electrostatic discharge protection circuit described in claim 19, wherein the electrical sink is a supply voltage.

23. The self-biased electrostatic discharge protection circuit described in claim 19, wherein the protection transistor is an NPN transistor.

24. The self-biased electrostatic discharge protection circuit described in claim 19, wherein the integrated circuit device comprises a multipoint low voltage differential signaling device.

25. The self-biased electrostatic discharge protection circuit described in claim 19, wherein the protection transistor is a PNP transistor.

26. A self-biased ESD protection circuit for protecting an integrated circuit operating in a normal voltage range that includes both positive and negative voltage levels, comprising:
    an input/output connection for receiving a voltage;
    a MOS protection transistor having a drain coupled to the input/output connection, a source coupled to an electrical sink and a gate, the protection transistor operable to provide electrostatic discharge (ESD) protection from the input/output connection to an electrical sink; and
    a metal oxide semiconductor (MOS) biasing network electrically coupled to the input/output connection and the protection transistor, the MOS biasing network operable to bias the protection transistor in a non-conductive state when a negative voltage within the normal operating voltage range of the integrated circuit is received at the input/output connection, to bias the protection transistor in a non-conductive state when a positive voltage within the normal operating voltage range of the integrated circuit is received at the input/output connection and to bias the protection transistor to conduct current to the electrical sink upon the occurrence of an electrostatic discharge event at the input/output connection.

27. The self-biased electrostatic discharge protection circuit described in claim 26, wherein the MOS biasing network comprises:
    a first biasing element having a source electronically coupled to the base of the protection transistor and a drain electronically coupled to the input/output connection; and
    a second biasing element having a drain electronically coupled to the base of the protection transistor and a source electronically coupled to the electrical sink.

28. The self-biased electrostatic discharge protection circuit described in claim 26, wherein the electrical sink is an electrical ground.

29. The self-biased electrostatic discharge protection circuit described in claim 26, wherein the electrical sink is a supply voltage.

30. The self-biased electrostatic discharge protection circuit described in claim 26, wherein the protection transistor is an NMOS transistor.

31. The self-biased electrostatic discharge protection circuit described in claim 26, wherein protection transistor is a PMOS transistor.

32. The self-biased electrostatic discharge protection circuit described in claim 26, wherein the integrated circuit device comprises a multipoint low voltage differential signaling device.

\* \* \* \* \*